June 6, 1939.   H. T. LAMBERT   2,161,359
BRAKE CONSTRUCTION
Filed Nov. 10, 1937   3 Sheets-Sheet 1
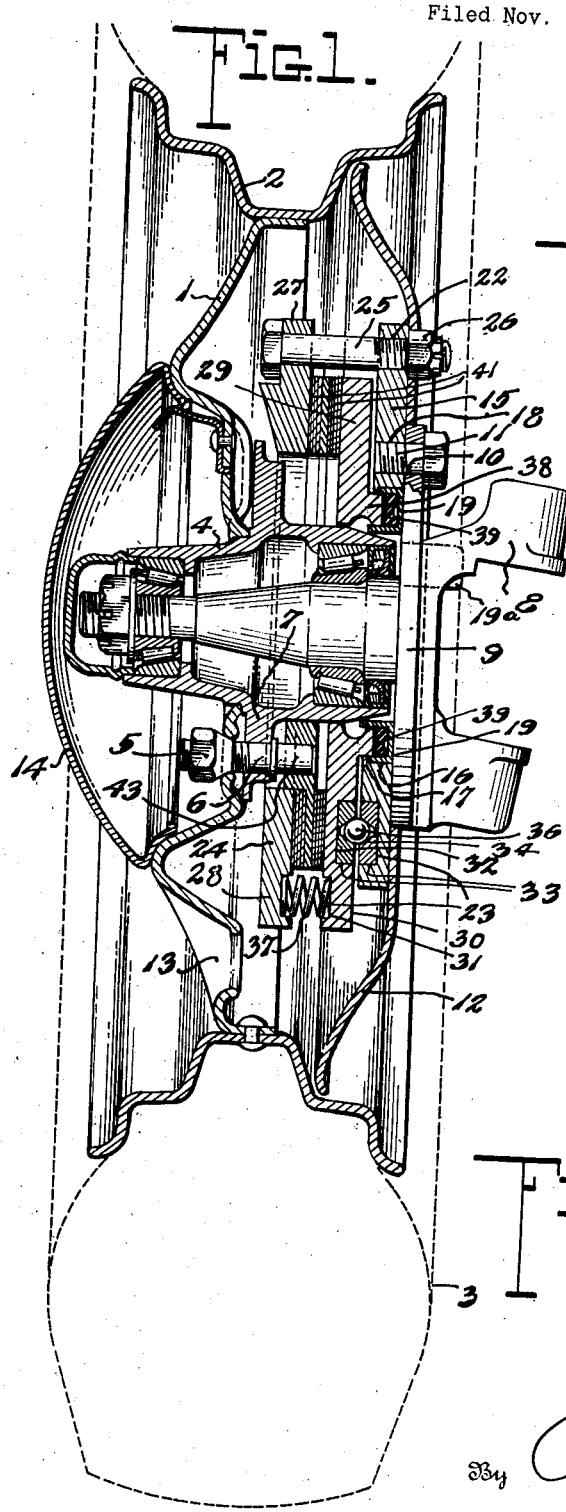
Fig.1.
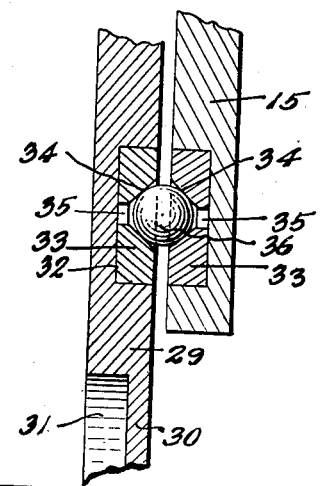
Fig.9.
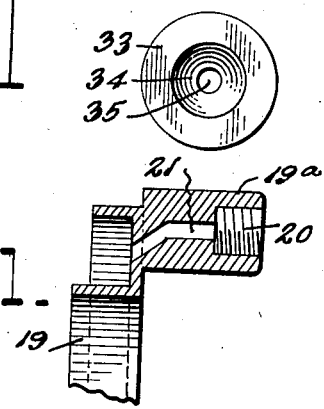
Fig.10.
Fig.11.
Inventor
H. T. Lambert
By Robb & Robb
Attorneys June 6, 1939.  H. T. LAMBERT  2,161,359
BRAKE CONSTRUCTION
Filed Nov. 10, 1937   3 Sheets-Sheet 2
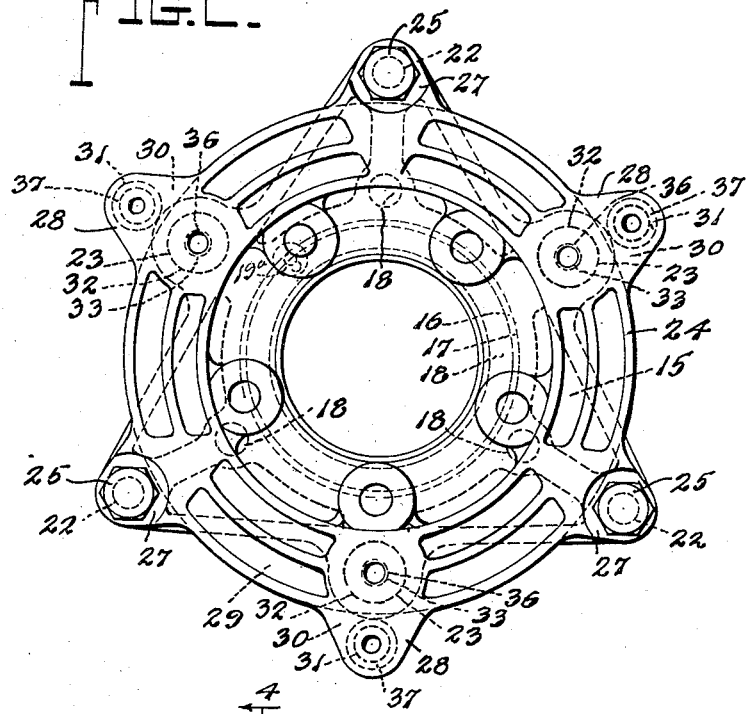
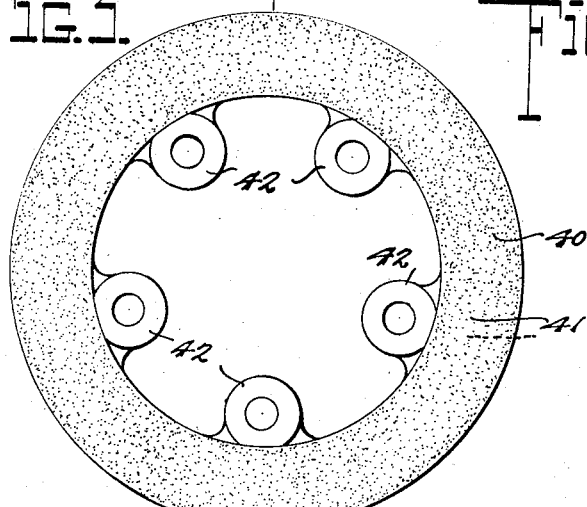
Inventor
H. T. Lambert
By Robb & Robb
Attorneys

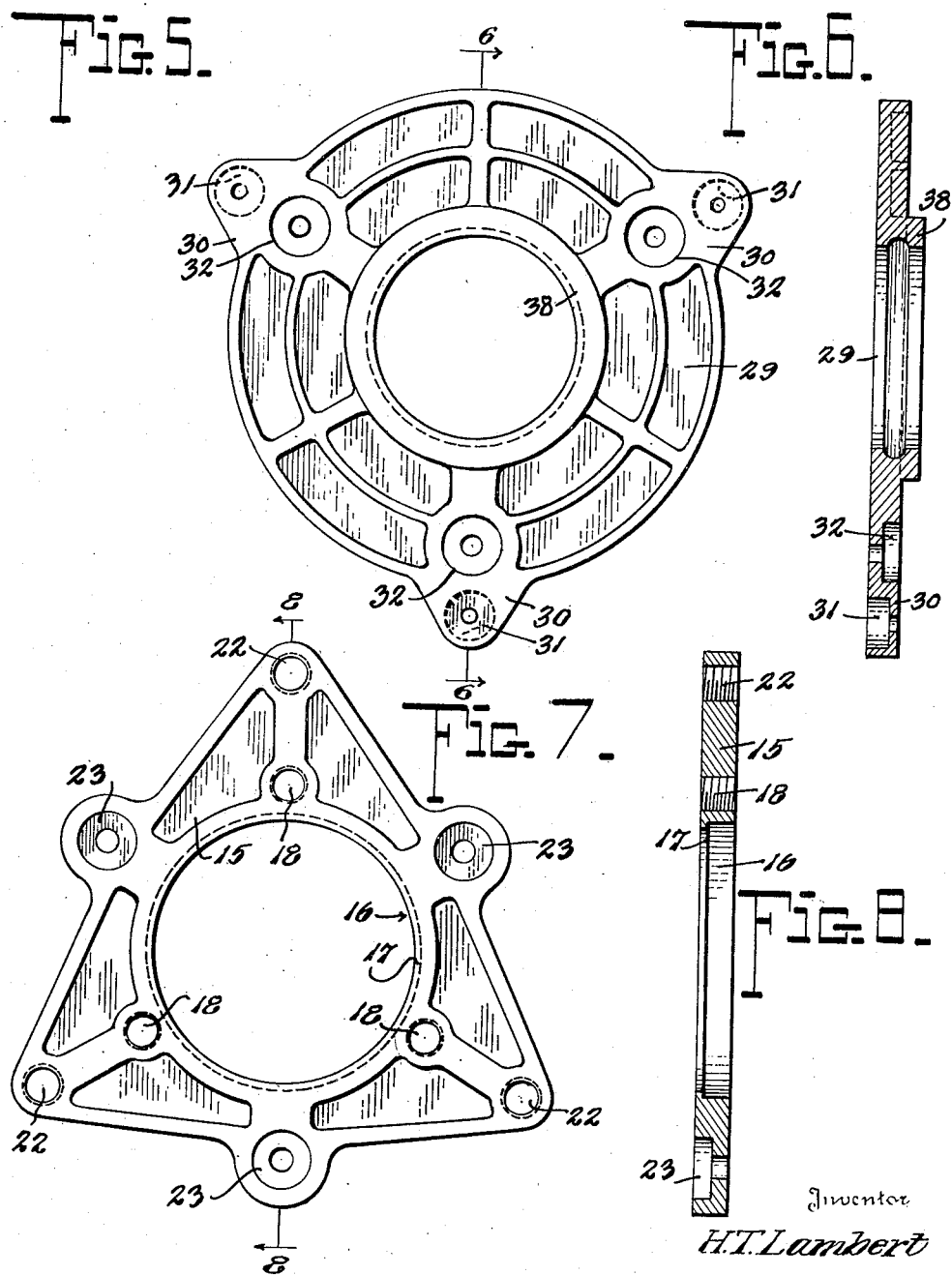

Patented June 6, 1939

2,161,359

UNITED STATES PATENT OFFICE 2,161,359

BRAKE CONSTRUCTION

Homer T. Lambert, St. Joseph, Mich.

Application November 10, 1937, Serial No. 173,934

5 Claims. (Cl. 188—72)

This invention relates to brake constructions, and more particularly to improvements in self-energizing brakes adaptable for use in connection with motor vehicles, such as automobiles.

This invention is an improvement over the constructions disclosed in my prior patents, Nos. 2,063,443; 2,063,444, and 2,063,445.

In these previous constructions just referred to, the securing means for supporting the assembled brake unit on the stationary wheel supporting frame or flange was located at or near the outer portion of the brake unit, while the brake adjusting means or take-up and thrust carrying tie-bolts for holding the stationary brake disc in its proper adjusted position with respect to the energizer plate, the free floating pressure plate, and the brake ring were disposed near the central portion of the brake unit inside of the circle of bolts constituting the securing means referred to above.

I have found that by rearranging the mounting of the device so as to place the securing means near the center of the unit and positioning the brake adjusting or take-up tie-bolts outside of the circle of the securing bolts and at the outer periphery of the unit, numerous advantages of construction are obtained.

In the first instance, the brake unit is more readily adaptable for assembly on existing types of automobile constructions with little or no alteration thereof.

Secondly, by arranging the brake adjusting or take-up bolts at the greatest possible distance from the center of the brake unit and out beyond the periphery of the brake rings, the tendency of the heat generated during the braking operation from being transmitted to these tie-bolts is reduced, thus reducing the liability of a change in the relative lateral position of the braking parts during extreme braking conditions.

In addition to the above, the disposition of the tie-bolts at the periphery of the brake unit facilitates the supporting of the stationary brake disc against rotary movement and distortion by the brake disc during the braking operation.

A further improvement lies in the employment of camming units located back of the brake ring and intermediate the inner and outer diameters thereof, these camming units comprising hardened steel insert discs formed with conical depressions and seated in opposing recesses in the energizer plate and pressure plate, and a ball member seated in the conical recesses constituting the cooperating camming element.

These inserts are readily removable and replaceable, require no initial alinement, as is the same in my former constructions wherein rollers are employed and the inserts are provided with camming grooves; also inserts having conical recesses are more easily and economically manufactured and are practically free from distortion by the heat which is generated during the braking operation.

In the present arrangement, I also dispose the expansion or disc-separating springs at the outer periphery of the unit, whereas in my former constructions these expansion or normalizing springs were disposed at or near the inner portion of the device.

Several important advantages are obtained by the present arrangement. By placing the springs in recesses formed in the periphery of the stationary plate and the free floating pressure plate, these springs are located in practically the coolest part of the apparatus and where the air circulates freely, and, therefore, they can not become unduly heated during prolonged braking operations, and are not likely to readily lose their temper due to heating. By placing the springs at a much greater radial distance from the center of the brake unit a much greater leverage is effected by the springs for returning the free floating plate to its non-braking position, thus permitting the use of lighter and more flexible normalizing springs with the result that much less initial braking effort is necessary to accomplish the initial braking engagement.

Other and further objects and advantages of the invention will be hereinafter set forth and the novel features thereof defined by the appended claims.

In the drawings:—

Figure 1 is a vertical sectional view taken through a vehicle front wheel construction and illustrating my improved brake unit applied thereto.

Figure 2 is a front elevation of my brake assembly unit.

Figure 3 is plan view of the brake ring.

Figure 4 is a sectional view taken on the line 4—4 of Figure 3.

Figure 5 is a side elevation of the outer or stationary brake disc.

Figure 6 is a detail sectional view on line 6—6 of Figure 5.

Figure 7 is an elevation of the energizer plate.

Figure 8 is a sectional view on the line 8—8 of Figure 7.

Figure 9 is an enlarged, fragmentary, detail view of one of the camming devices.

Figure 10 is an enlarged, detail view of one of the hardened camming disc inserts.

Figure 11 is a fragmentary, sectional view of a portion of the fluid pressure brake actuating ring disclosing the pressure fluid inlet boss formed thereon.

Like reference characters designate corresponding parts in the several figures of the drawings.

Referring to Figure 1 of the drawings, I indicates a rotary member to be braked, such as an automobile wheel having the usual rim 2 and tire 3 demountably secured on the hub portion 4 by wedging nuts 5 threaded on the stud bolts 6 fixed in the wheel flange 7 in the customary manner. This figure illustrates the front wheel construction in which 8 indicates the steering knuckle on which the hub member 4 is journaled in a well known manner. The steering knuckle or wheel support is provided with a brake supporting flange 9, apertured at 10, for the reception of the brake assembly retaining cap screws 11. A dust guard 12 is provided for protecting the brake mechanism against dust and other foreign matter. Air circulating recesses or openings 13 may be provided in the wheel where desired or necessary to afford cooling of the brake mechanism during the braking operation.

The wheel, as illustrated, is provided with a removable hub cap 14 enclosing the hub portion 4 and concealing the wheel retaining wedge bolts 5 on the hub flange 7.

Referring now particularly to my improved brake unit, 15 denotes an energizer plate preferably of web construction, as shown in Figure 7, for obtaining the maximum amount of strength with a minimum weight. This plate is formed with a circular aperture 16 having an annular flange 17, and is provided near its central portion with threaded openings 18 for the cap screws 11. A circular fluid-pressure channel member 19 is seated in the central opening 16 of the energizer plate, as seen in Figure 1, and retained in proper position against the brake supporting flange 9 by the overhanging flange 17 surrounding the central opening. This fluid-pressure channel member is provided with a fluid inlet boss 19a projecting through an opening in the brake supporting flange 9. The boss has an enlarged internally threaded portion 20 for the reception of a suitable fluid pressure conduit, not shown. A passage 21 leads from the enlarged portion in the boss to the base of the channel.

Disposed around the periphery of the energizer plate are threaded tie-bolt receiving openings 22 and recesses 23 for the reception of camming discs later to be referred to.

A stationary brake disc 24 of circular form, as seen in Figure 2, is supported in parallel spaced relation to the energizer plate 15 by tie-bolts 25 screwed into the openings 22 and locked in their adjusted position by the jam-nuts 26, radial supporting lugs 27 being provided on the periphery of the stationary brake disc and apertured to receive the tie-bolts. At equally spaced points around the periphery of the stationary plate intermediate the supporting lugs 27 are projections 28 recessed to receive brake supporting springs, later to be referred to.

A free floating pressure plate 29 is disposed adjacent the energizer plate 15 and intermediate this plate and the stationary brake disc. This energizer plate is circular in form, as seen in Figure 6, and provided at equally spaced points around its periphery with projections 30 recessed at 31 to receive the previously referred to normalizing coil springs. Recesses 32 are formed in the face of the pressure plate adjacent the energizer plate, as seen in Figure 1, for the reception of the camming disc inserts.

The camming disc inserts, above referred to, each comprises a circular hardened disc 33 of steel or other suitable material having a conical depression 34 in its center and a central pilot hole 35. When the pressure plate is assembled in its position adjacent the energizer plate 15, the camming disc insert 33 in the recess 23 in the energizer plate is in opposing relation to a second camming disc 33 seated in the recess 32 in the pressure plate, and a ball member 36 is disposed in the conical depressions 34 of the inserts. The coil spring recesses 31 in the stationary disc and pressure plate are disposed in alinement when the pressure plate is in its normalized or non-braking position, a coil spring 37 being seated in these recesses and stressing the pressure plate toward the energizer plate.

The energizer plate is provided with a central opening to accommodate the axle and hub members of the wheel, and surrounding this opening is an annular flange or piston member 38 seated in the fluid pressure channel member 19. Suitable fluid-tight packing 39 is disposed in the channel to prevent escape of the fluid pressure between the piston member and the walls of the channel.

Interposed between the stationary brake disc 24 and the free floating pressure plate 29 is a brake ring 40, a detail of which is shown in Figures 3 and 4 of the drawings. This brake ring is provided with friction lining 41 and inwardly-projecting driving lugs 42 apertured to receive the projecting ends 43 of the stud bolts 6.

In the operation of the device, fluid pressure is admitted into the channel member 19, thrusting the free floating pressure plate 29 into frictional contact with the rotating brake ring 40. This causes a preliminary rotation of the pressure plate displacing one set of the camming discs 33 with respect to the second set in the energizer plate. The ball members 36 are thus displaced causing a secondary braking thrust to be effected against the brake ring and its adjacent stationary brake disc. This preliminary rotative movement also moves one set of the coil spring seats with respect to the second set in stationary brake discs, thus distorting the spring laterally as well as placing the same under compressive strain, and, upon release of the pressure fluid, these coil springs return the pressure plate to it normalized, non-braking position. By arranging the securing means for the energizer plate at or near the central portion of the plate, I am able to mount my improved brake unit on existing types of wheel supports without material alteration thereof. It is, however, necessary to drill a hole through the brake supporting flange 9 to accommodate the boss 19a on the fluid pressure channel. Since considerable heat is generated during the braking operation, I have arranged the coil springs 37 and the tie-bolts 25 at the periphery of the braking unit where the heat is lowest and also the maximum amount of air circulation is present. The location of the coil springs at the periphery also provides a greater degree of circular thrust upon distortion thereof during braking operation, and, consequently, a smaller or lighter spring may be used, reducing the initial braking effort required and effecting a more flexible brake construction. The camming discs 33 having the conical inserts are more economical to manufacture and do not tend to warp or distort due to heat during the braking operation, and under normalized, non-braking conditions, the two opposing conical recesses and their cooperation with the ball members tend to maintain the free floating disc in proper centralized alinement.

While I have disclosed the front wheel construction of an automobile, it is to be understood that the device is readily applicable to the rear wheel construction, as well as to many other mechanisms where brake members are employed.

What I claim is:

1. In a brake mechanism of the class described, a support, a rotary member to be braked carried by said support, an energizer plate surrounding said support, a stationary brake disc disposed in spaced parallel relation to said energizer plate, a free floating pressure plate interposed between the aforesaid plate and disc, a rotary brake ring connected to said rotary member and interposed between said stationary brake disc and said free floating pressure plate, means for moving said free floating pressure plate into frictional contact with said brake ring to effect rotation of said pressure plate by said brake ring, camming means between said pressure plate and said energizer plate operable upon relative rotation of said pressure plate for moving the pressure plate into further frictional contact with said brake ring, means beyond the periphery of said brake ring connecting the stationary brake disc to said energizer plate, and means disposed beyond the periphery of said brake ring and interposed between the stationary brake disc and the free floating pressure plate for moving the last-mentioned plate away from the said rotary brake ring.

2. In a brake mechanism of the class described, a support, a rotary member to be braked carried by said support, an annular energizer plate surrounding said support and connected to the support adjacent its center, an annular stationary brake disc connected at its periphery with the periphery of said energizer plate and disposed in spaced relation to said energizer plate, a free floating pressure plate disposed within the confines of the connecting means between the energizer plate and the stationary brake disc for rotary movement and lateral movement toward and away from said stationary brake disc, a rotary brake ring disposed within the confines of the last-mentioned connecting means and interposed between the stationary brake disc and the free floating pressure plate to be frictionally engaged thereby, means extending through the central portion of said stationary brake disc connecting said brake ring with said rotary member for rotating the brake ring, means for moving said free floating pressure plate laterally into frictional engagement with the rotary brake ring to cause relative rotary movement of the last-mentioned plate with respect to the energizer plate, camming means disposed between the energizer plate and the free floating pressure plate and behind the brake ring operable upon said last-mentioned relative rotary movement to cause braking engagement of the brake ring with the stationary brake disc, and spring means arranged between the periphery of the stationary brake disc and the periphery of the free floating pressure plate and outside of the confines of the brake ring for stressing the free floating pressure plate toward the energizer plate and yieldably resisting rotary movement of the free floating pressure plate.

3. In an apparatus of the class described, a brake unit comprising an energizer plate apertured adjacent its central portion to receive means for securing the same to a support, a stationary brake disc adjustably secured at its periphery to the periphery of said energizer plate, a rotary and laterally shiftable pressure plate arranged within the confines of said peripheral securing means and between the stationary brake disc and the energizer plate, spring means interposed between the peripheral portion of said stationary brake disc and said pressure plate for urging said pressure plate toward said energizer plate and yieldably resisting rotation of said pressure plate, a brake ring within the confines of said peripheral securing means and said peripherally arranged spring means having driving means projecting inwardly from the inner portion of said brake ring for connection with an element to be braked, and camming means between the energizer plate and the pressure plate comprising a pair of opposing camming discs inserted in recesses in the pressure plate and energizer plate, each disc having a conical-shaped recess formed centrally thereof and a ball member between the camming discs seated in said recesses.

4. In a brake mechanism of the class described, a pair of relatively fixed parallel annular members, adjustable tie-bolts disposed around the periphery of said members for fixedly supporting one of said members from the other, an annular pressure plate rotatably disposed between the members and shiftable toward and away from said members, coil spring means disposed around the periphery of said plate between one of said members and the plate for moving the plate toward the other member, camming means disposed between the plate and the other member for compressing the spring members upon relative rotation of the plate with respect to the members, an annular brake ring arranged between the plate and one of the stationary members, a rotary member to be braked, means connecting the brake ring with the member to be braked comprising driving lugs projecting radially inward from the brake ring and lateral projections on the rotary member to be braked projecting within the brake ring in cooperating engagement with the projections aforesaid, and means to preliminarily shift the pressure plate into engagement with said brake ring to cause relative rotation of the plate and to effect camming operation of the camming means.

5. In a brake of the class described, a support having an annular fluid pressure groove, an energizer plate surrounding said groove and secured adjacent the groove to the support, and formed with tie-bolt receiving recesses in the periphery, a spaced stationary brake disc disposed parallel to said energizer plate having tie-bolt receiving recesses in its periphery, and intermediate similarly located coil spring seating recesses, tie-bolts disposed in the tie-bolt recesses for fixedly securing the stationary brake disc to the energizer plate, an annular rotary and laterally shiftable pressure plate having an annular piston flange seating in the pressure groove on the support, fluid-tight packing between the piston flange and the walls of the groove, said pressure plate being disposed intermediate the energizer plate and the stationary brake disc and within the confines of the surrounding tie-bolts and formed with coil spring seating recesses in its periphery, coil springs seated in the coil spring recesses of the stationary brake disc and rotary pressure plate for stressing the pressure plate toward the energizer plate and yieldably resisting rotary movement of the pressure plate, opposing camming inserts seated in recesses formed in the adjacent faces of the energizer plate and pressure plate comprising a pair of hardened disc-like members having corresponding conical depressions and a ball member seated in the conical depressions whereby rotating movement of the presssure plate causes camming action on the ball member and separation between the energizer plate and the pressure plate, a member to be braked disposed between the stationary brake disc and the pressure plate, and fluid pressure means for shifting the pressure plate into contact with the members to be braked to effect preliminary rotary movement of the pressure plate and relative displacement of the camming inserts.

HOMER T. LAMBERT.